(12) United States Patent
Gundlach

(10) Patent No.: US 6,681,593 B1
(45) Date of Patent: Jan. 27, 2004

(54) THERMAL ENERGY STORAGE SYSTEM

(76) Inventor: Robert W. Gundlach, 2434 Turk Hill Rd., Victor, NY (US) 14564-9616

(*) Notice: Subject to any disclaimer, the term of this patent is extended or adjusted under 35 U.S.C. 154(b) by 0 days.

(21) Appl. No.: 10/447,037

(22) Filed: May 28, 2003

(51) Int. Cl.[7] ............................................. F25D 17/02
(52) U.S. Cl. ..................... 62/434; 62/324.1; 62/324.6
(58) Field of Search ................................ 62/434, 324.1, 62/324.6; 165/10, 104.17, 145

(56) References Cited

U.S. PATENT DOCUMENTS

| | | | | |
|---|---|---|---|---|
| 4,285,389 A | * | 8/1981 | Horton | 165/85 |
| 4,480,445 A | * | 11/1984 | Goldstein | 62/434 |
| 5,944,089 A | * | 8/1999 | Roland | 165/10 |

OTHER PUBLICATIONS

C. P. Gilmore, "How to Win with ACES" Poplar Science, Jul. 1981, p. 49.

* cited by examiner

Primary Examiner—Melvin Jones
(74) Attorney, Agent, or Firm—William A. Henry, III

(57) ABSTRACT

A FreeTherm thermal energy storage system includes an ice-water shallow pool used for storing and extracting thermal energy cyclically, by thawing the ice and freezing water intra-seasonally. A series of heat extractors positioned within the shallow pool are adapted to extract heat during the formation of ice. Bladders are connected to the heat extractors and also connected to a conventional heat pump and have an anti-freeze mix that is maintained at sub-freezing temperatures flowing through their interiors to remove heat from the heat extractors. The extractors have concave-downward surfaces for extracting heat from water to produce ice. The heat extractors are made of flexible material that can be expanded to release ice from their surfaces, and are adapted to pivot up and out of the way to allow the released ice to float to the top of the reservoir.

During the summer cooling cycle, convection assisted insulated tower and program of upward airflow is used to deliver heat from a thermal reservoir of water through a heat exchanger to relatively cooler outdoor air. The heat exchanger is used to refresh the thermal reservoir with cool water during periods when the outdoor air is substantially cooler than the water in the reservoir.

20 Claims, 2 Drawing Sheets

THERMAL ENERGY STORAGE SYSTEM

BACKGROUND OF THE INVENTION

1. Field of the Invention

This invention relates to the field of heat pumps, and more particularly, to a rechargeable thermal energy storage system that utilizes an ice-water reservoir for storing and extracting thermal energy cyclically, by thawing the ice and freezing water intra-seasonally for use in a heat pump system.

2. Description of Related Art

Heat pumps have proven to be extremely useful for lowering energy consumption for home heating in winter and home cooling in summertime. Using a heat pump, the energy required for a heat pump to transfer a given amount of thermal energy, depends directly on the temperature difference between the heat source and receiver from and to which the thermal energy is transferred. This is because a heat pump actually moves heat, rather than creating it. The amount of energy required to move a given volume of heat transfer fluid, is, to the first order, independent of the amount of heat contained in that fluid. So the temperature of the source of heat being pumped into the dwelling being heated in winter, and the temperature of the receiving reservoir for heat that is transferred out of the dwelling being cooled in the summer are crucial for determining the efficiency of a heat pump system for heating or cooling a dwelling.

In the zones of the earth greater than 20° latitude from the equator, the rate of input of thermal energy needed to maintain a comfort level of about 20° C. in a dwelling is greatest in the fourth and fifth weeks of winter. Obviously, that's the time of year when the outdoor air is generally at its lowest temperatures. The low thermal mass of a given volume of air, (combined with its low temperature in those periods of winter, makes outdoor air a poor source of thermal energy for home heating whenever the outdoor temperature falls below about 10° C. Also, warm outdoor air is a poor receiver of heat for home cooling in summer months when outdoor temperatures rise above about 25° C.

If it were practical to store thermal energy in sufficient quantity for six months at a time, thermal energy could be harvested in the warmest summer months, and saved until needed for home heating in the winter months. Conversely, warming the home in the coldest periods of winter, by freezing water and storing the ice produced in the process, could provide a reservoir of a "heat sink" to be used to cool the dwelling over the coming summer. Such a system was proposed and published by C. P. Gilmore, "How to Win with ACES" (Annual Cycling Energy System) in Popular Science, July 1981, pg.49. Gilmore proposed cooling a dwelling by extracting thermal energy from it to melt a large reservoir of ice, and storing the energy in the form of water until wintertime, when it would be refrozen, extracting its latent heat of fusion for heating the dwelling throughout the cold winter months. Several serious problems prevented practical application of the ACES concept. One is that it requires an equal number of heating degree days and cooling degree days, or a balance between the winter heating and summer cooling requirements. A typical home (e.g., a 2-ton house) between about 35° to 45° latitude requires about one "ton of heating" on an average day of mid-winter. One "ton of heating" is defined as the rate of thermal energy needed to melt one ton of ice in 24 hrs. That comes to 840 cal/sec. The "tons" heat rating for a given house depends on its size, insulation features, exposure to sun and winds, climate of its location, etc. Bear in mind that the rating states the maximum heat needed on the coldest winter days, which is just about twice the heating rate needed on an average winter day.

Another metric useful for estimating the heating rate required to maintain comfort in a given house on a given day is dependent on the outdoor temperatures, and is expressed in terms of heating degree days. The "heating degrees" for a given day is determined by subtracting the average temperature (the sum of the high and low temperatures over 24 hours, divided by two) from 65° F. or 18.3° C. In geographic latitudes between 35° to 45°, heating degree days per year averages about 5,000 to 8,000. Rochester, N.Y., for example, averages about 6,000 to 6,200 heating degree days Fahrenheit (3,400 htg. deg. days C.) per year.

Since an average temperature on a mid-winter day in those latitudes is about −4° C., and requires one ton of heating for a 2-ton house, it is found that each ton of heating maintains comfort for a 2-ton house on a 22.3 htg. deg. day C. Thus, one would need 1 ton of heating per 22.3 htg. deg. days C., or 1/22.3 tons=0.045 ton per heating degree day C. For a heating system with a COP of 3.0, based on extracting heat by freezing water, one ton of heating is generated from freezing ⅔ ton, or 0.605 m$^3$ of ice/day. (The other ⅓ ton comes from the electrical power.) One must also conclude, then, that throughout an average season of 6,100 htg. deg. days F. (3,400 htg. Deg. days C.) we need 153 ton-days, which, at ⅔ ton of water to ice per day for each ton of heating, requires freezing 102 tons of water to ice. Each ton of water is 0.907 m$^3$ of water, so 102 tons=92.5 m$^3$ of water, which expands 11% to 102.7 m$^3$ of ice, in volume. That would take a basement of water, about 8 m wide×12 m long×0.96 m deep in water, which, upon freezing would expand upward to 1.07 meters high in ice, if it didn't expand laterally, crushing the basement walls as it froze.

Thus, the most severe problem of ACES, is to freeze such volumes of water without producing extreme pressures that would deform cooling coils distributed within the water, and would damage the reservoir walls containing the water while freezing it to ice.

The present invention presents solutions to each of these problems by providing a practical means for wintertime heating and summertime cooling of dwellings, while consuming only about ⅓ of the energy required by conventional heating means.

SUMMARY OF THE INVENTION

Accordingly, pursuant to the features of the present invention, a FreeTherm thermal energy storage system is disclosed that includes an ice-water reservoir used for storing and extracting thermal energy cyclically, by thawing the ice and freezing water intra-seasonally. A series of heat extractors are positioned within a pool of water that is connected to the reservoir. The heat extractors are adapted to extract heat from water in the process of making ice. Additionally, the heat extractors actively manage the formation of ice to prevent excessive build-up on the heat exchange surfaces that would reduce heat transfer efficiency. The heat extractors are connected to a conventional heat pump and have an anti-freeze fluid that is maintained at sub-freezing temperatures flowing through a bladder attached to a surface thereof. The extractors have concave-downward surfaces for extracting heat from water to produce ice. The extractors are made of flexible, hydrophopic (water repellent) material that can be expanded or bent to release the less flexible ice from their surfaces, and are adapted to pivot up and out of the way to allow the released ice to float to the top of the pool of water. The released ice floats to the surface of the pool of water and is delivered to the reservoir by a conveying mechanism. By maintaining an ice water slurry at the top of the reservoir, potential damage to the reservoir due to freezing water expansion is prevented.

BRIEF DESCRIPTION OF THE DRAWINGS

The foregoing and other features of the instant invention will be apparent and easily understood from a further reading of the specification, claims and by reference to the accompanying drawing wherein:

While the present invention will be described hereinafter in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

The invention will now be described by reference to a preferred embodiment of the FreeTherm system of the present invention.

In general, a thermal energy storage system is disclosed that is cost effective and space efficient and comprises the use of a shallow pool and an ice-water reservoir for storing and extracting thermal energy cyclically by thawing the ice and freezing water intra-seasonally.

Figure 1:
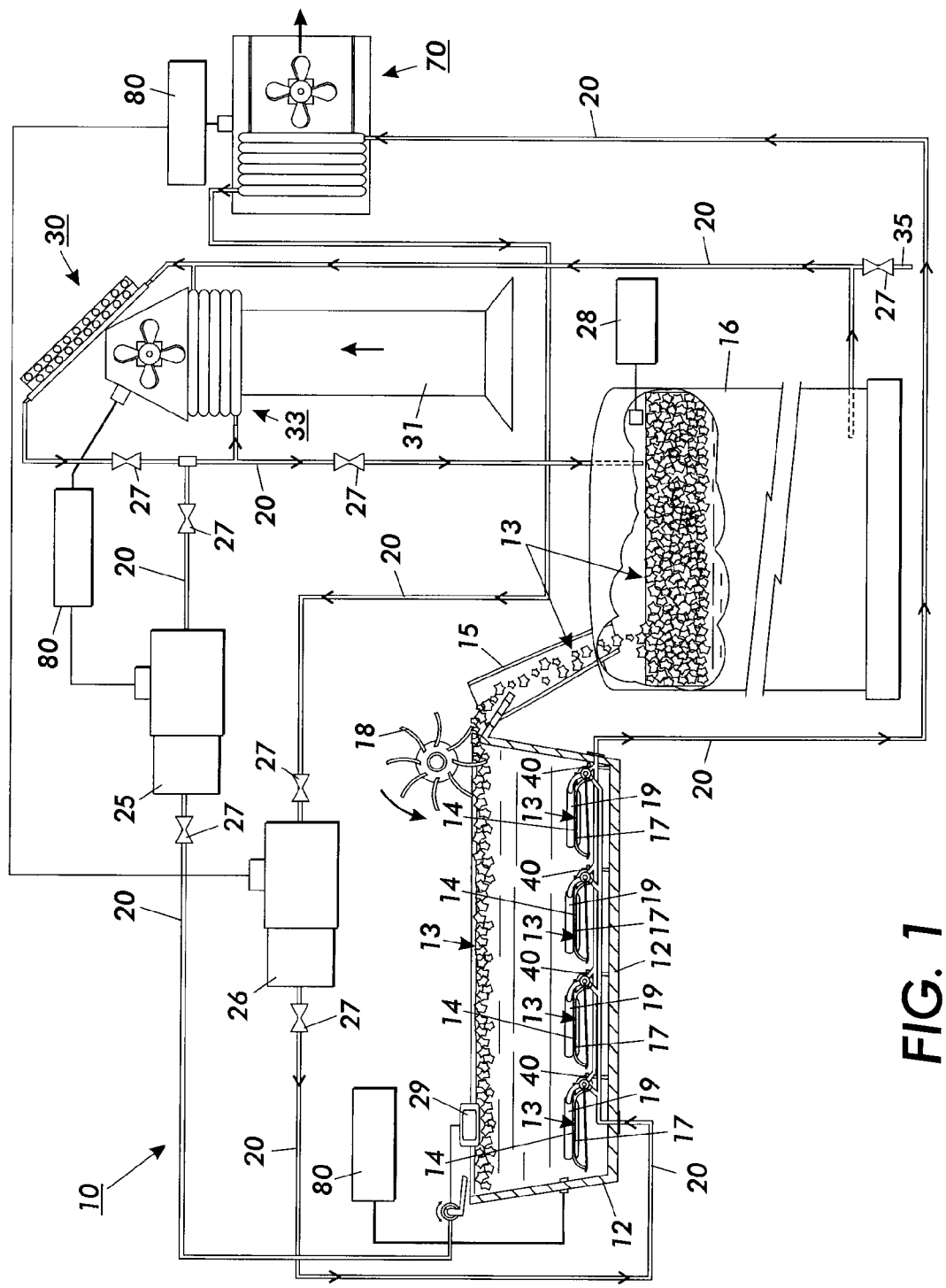
FIG. 1 is a schematic illustration of the ice-water shallow pool and reservoir used in the present invention.
Figure 2:
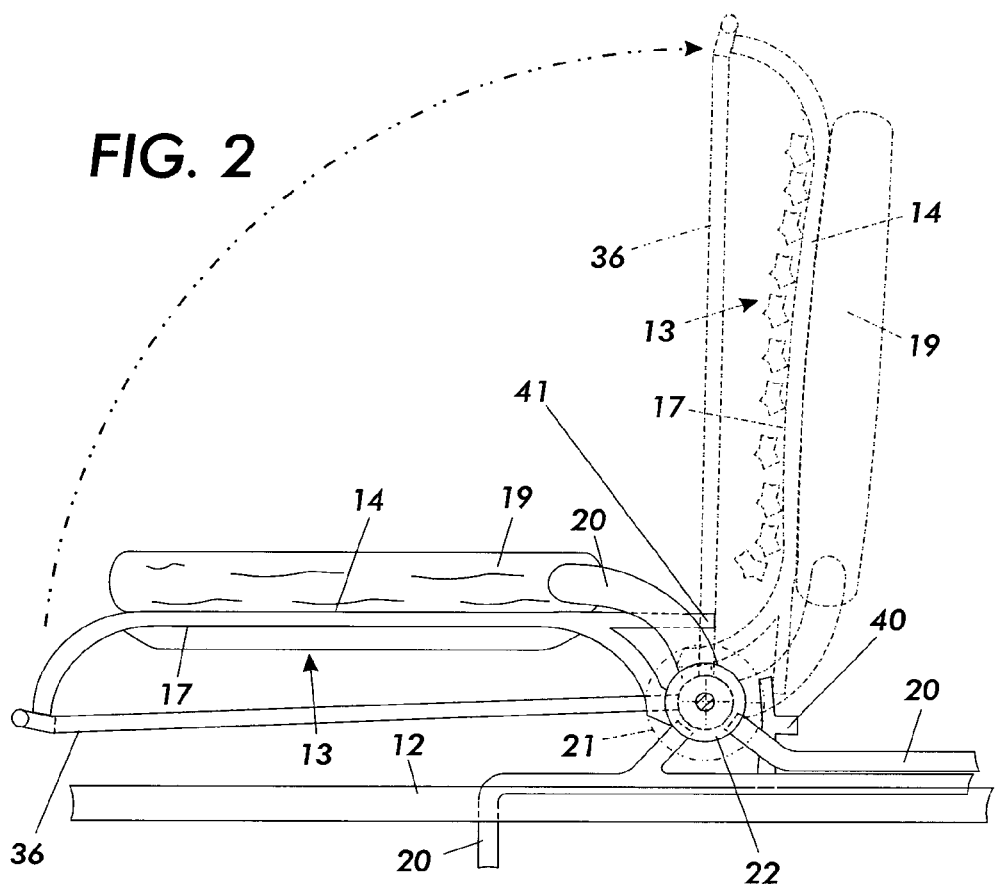
FIG. 2 is a partial schematic side view illustration showing a heat extractor with a bladder attached in an initial position and dotted line actuated position.
Figure 3:
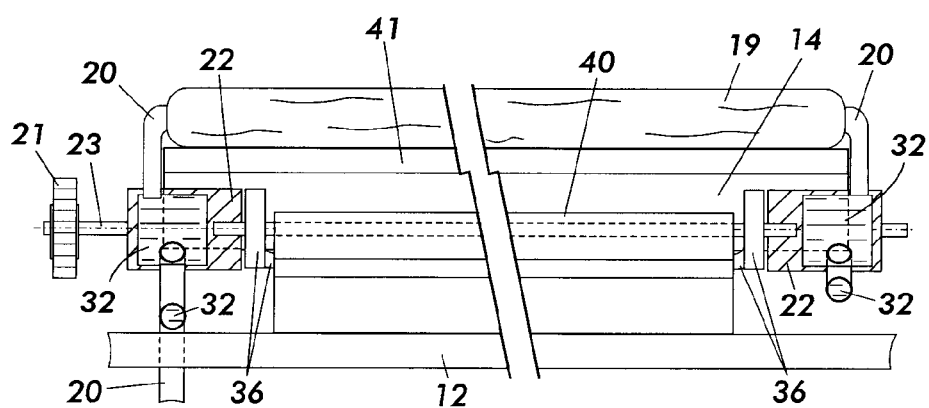
FIG. 3 is a partial schematic end view of the heat extractor of FIG. 1.

Referring now particularly to FIGS. 1–3, there is illustrated an exemplary FreeTherm system 10 in accordance with the present invention for providing a source of heat for maintaining comfortable temperatures within habitable dwellings throughout the winter heating season, and a means of cooling in summer.

In accordance with the present invention shown in FIG. 1, a shallow ice-water pool 12 is disclosed that includes heat extractors 14 having surfaces thereon for freezing water to ice and positioned within pool 12 to cyclically remove and deliver heat for freezing water and melting ice indefinitely without creating destructive forces that would damage the ice-making extractors 14 or the associated ice-water reservoir 16 located in the ground, near and below pool 12, and connected to it by a steep ice-chute 15 that carries pieces of ice 13 from the surface of water in pool 12, where a bristle brush conveyor 18 delivers floating pieces of ice 13 into the chute 15 where they slide downward into the ice-water reservoir 16.

The fact that water reaches its maximum density at +4° C. is exploited to produce convection of the colder water by entrapping lower density water (between +4 and 0°) under the concave downward hydrophobic (release) surface 17 (FIG. 2) of heat extractor 14 held at temperatures below 0° C. This concave downward surface of a thin, flexible, and thermally conducting sheet 14 is mounted in an approximately horizontal plane, and thermal energy is extracted, by sub-freezing anti-freeze fluid 32 from heat pump 70, flowing through bladder 19 until ice forms on the hydrophobic concave downward surface 17. As shown in FIGS. 2 and 3, bladder 19 is adhesively attached directly to an outer upper surface of heat extractor 14 and is adapted to remove energy from the water producing ice attached to an inner lower surface of the heat extractor. After the ice builds to a thickness of about a cm or so, the concave downward sheet 14 is pulled upward on the unsupported end through rotation of wheel 21 by conventional means which, in turn, rotates manifold 22 that is connected to shaft 23 into an arc of approximately 95° against a back stop 40 and extension 41 which stops rotation of sheet 14 at about 90°. Arm 36 which is mounted on shaft 23 contacts a cantilevered portion of the front end of sheet 14 as shaft 23 is rotated such that continued rotation of manifold 22 into an arc of 95° causes sheet 14 to flex in a clockwise direction thereby releasing the ice (which is non-elastic) formed on the hydrophobic surface of sheet 14, and with the sheet now being raised, allowing the ice to float to the top of the ice water pool 12. An alternative method of release would be close a valve downstream of the bladder, causing the bladder to expand under pressure, thus deforming its shape and breaking the ice free. An array of such hydrophobic concave downward surfaces is supported in a plane near the bottom of the pool 12 as shown in FIG. 1. The total area of the heat extracting surfaces must be adequate to generate ice at the rate of 0.605 $m^3$ of ice/day or 7 $cm^3$/sec. This would require a pool area of about 1 $m^2$ per ton of heating rate delivered. The ice-water storage reservoir 16 must be sufficiently large to store floating pieces of ice generated in supplying the heating needs throughout the most severe period of unbroken thaw likely to be encountered. As ice pieces are conveyed into chute 15 and reservoir 16, water is pumped from the bottom of reservoir 16 to maintain the level of water in shallow pool 12, and can be controlled by float 29 at the surface of the pool 12 and sensor 28 at the surface of ice 13 in reservoir 16. Water is supplied to pool 12 as needed through piping 24 in response to movement of float 29. Under the appropriate conditions, this water could be passed through a convection tower 31, or a solar collector 30 to pick up additional heat with care being taken to ensure that the water is not exposed to freezing temperatures.

As shown in FIGS. 2 and 3, cold anti-freeze liquid is delivered by pump 25 through tubing or pipes 20 by way of manifold 22 into bladders 19, and through the bladders into contact with the back of the concave downward surfaces, forming a growing thickness of ice up to about 7 to 10 mm. The concave surfaces of the extractors are then periodically bent to larger (or even inverted) radii, in order to release the ice coatings. These two principles of design, 1) forming ice on flexible concave downward hydrophobic surfaces, then, 2) bending the freezing surfaces upward to release the ice, produce ice chunks 13 which float upward toward the top of the shallow pool 12, where the floating chunks 13 are driven by rotating cylindrical bristles 18 consisting of multiple rows of flexible bristles horizontally into chute 15 which channels them into the reservoir 16.

Pool 12 and reservoir 16 comprise a system for heating and cooling a dwelling by freezing water and melting ice without creating destructive forces on the equipment. The volume of the reservoir must be sufficient to allow for the packing fraction of the chunks of ice in the water.

With the intent of heating a dwelling, a heat pump 70 is employed to cool an anti-freeze solution below the freezing point of water, and deliver the extracted heat into the dwelling, after which, the sub-zero anti-freeze solution through pipes 20 and bladders 19 flows into contact with the thermally conductive, concave downward hydrophobic surfaced extractor 14, where it absorbs heat of fusion from ice-water pool 12, making ice, and completing the cycle of thermal energy transfer. The ice-water pool 12 must hold a sufficient volume of water to supply energy (latent heat of fusion) to the home by freezing adequate amounts of water to maintain the desired comfort level of the dwelling through periods of cold weather not likely to be exceeded in, for example, more than one in twenty years. That would give a 95% assurance that a sufficient reserve of heat of fusion of water is available to maintain the dwelling comfortably heated for any given winter. In other words, it would be desirable to use a pool and reservoir adequate for heating the home with the heat pump only, for nineteen out of twenty years. Only one in twenty years, then, would supplemental heating be needed; even in those winters of extreme cold, supplemental heat would be needed only for short periods, and the overall efficiency of this heating system will not be substantially compromised. The volume of such a tank would be determined by historical data on the average heating degree days per winter for the geographic locality of the building to be heated, as well as, the pattern of "thaws", which is to say those periods when the temperature rises above 42° F., that can be expected for that region. The amount of sunshine is also taken into consideration if a solar collector 30 will be used in the system in question. The tank size is also based on the heat load of the building in question, which is based on the heat-loss characteristics of the building, such as size, insulation of the walls, ceilings, windows, and roof, as well as exposure to cold winds, imperviousness to such winds, and access to solar heating, etc. The size of a heating system recommended for a building is determined by the maximum heating rate required at the peak of cold weather likely to be encountered. A common unit of heating power is a "ton", which is defined as the heating rate required to melt a ton of ice over a 24 hour period. Calculation shows that one ton of ice would require a heating rate of 12,000 Btu/hour, or 840 calories/second, to be melted in 24 hours. Most skilled practitioners of installing heating systems can readily estimate the maximum heating power required for a given dwelling based on the above mentioned considerations of climate, dwelling structure, insulation, and various heat loss characteristics, although computer programs and other aids, such as, nomographs are available to assist in this process.

The volume of the ice-water reservoir needed in the present invention is determined by the maximum accumulated value of heating energy required, based on the energy needed for that house during extended periods of cold outdoor temperatures, minus the energy recovered during periods of temperatures warm enough to melt the ice formed in the ice-water reservoir during the cold periods, or periods of sunshine during which a solar collectors 30 can be used to generate warm fluid that can melt ice. The energy needed for each day is determined by the heating degrees for that day, and by the "ton" rating for heating that house. When the average outdoor temperature is below 650 Fahrenheit (18.300° C.) the heating degree value for each day is defined as the difference between 65° F. and ½×(maximum+ minimum temp$^1$s) in that 24 hour period.

The same ice-water pool 12 is used for summertime cooling, but the thermally conductive extractors 14 are tipped vertically by conventional mechanical means to allow the warmed water to flow upward under convection forces, while heat is extracted from the dwelling being cooled, and delivered to the ice-water reservoir 16. Further, and in accordance with the present invention, a means for increasing the efficiency by which thermal energy can be extracted from substantially warmer outdoor air and delivered into the relatively cold ice-water reservoir includes a heat exchanger 33 comprising a convection assisted insulated tower 31 and a program of downward air-flow through the heat exchanger and tower, from convection forces.

In summer, when cooling is desired, the convection assisted tower 31 and program of upward airflow is employed to deliver heat from the thermal reservoir of water through the heat exchanger 33 to relatively cooler outdoor air. Heat exchanger 33 is used to refresh the thermal reservoir with cool water during periods when the outdoor air is substantially cooler than the water in the reservoir, for example, in the early summer morning hours. In winter, convection tower 31 extracts heat from the air during periods of thaw, in order to regenerate the ice-water reservoir by melting ice. This convection assisted heat exchange means for increasing the efficiency is essential if the overall coefficient of performance (COP) of the heat pump system is to be maintained at a minimum of 2.0. whenever the outdoor air reaches 5° C. or higher. The solar collector 30 can also be used to discharge heat on clear summer nights.

During periods of thaw, the antifreeze solution will be warmed in the heat exchanger and pumped into the bladders or sacks holding the anti-freeze solution against the metal surfaces of the concave downward troughs, which are now tipped upward so that the convection flow of warmed water upward melts the ice floating above it in the reservoir. It is estimated that at least enough warmth is provided to return a factor of four or more of thermal energy, compared to the total energy consumed by the air blowers and water pumps of the heat exchanger, thus enabling a commercially practical, viable process. That can be achieved whenever outdoor temperatures exceed about 42° F., or 5° C.

Additionally, solar collector 30 can be used to replenish the thermal reservoir by melting ice. The system controller 80 will determine which flow is appropriate based on temperature readings, in the tank, outdoors, and on the solar collector. The controller will selectively energize one or more of the valves 27 to direct the flow appropriately.

The operation of the water pump and air blowers in the heat exchangers for the process of melting ice is governed by a conventional computerized control system 80 that senses the unfrozen water left in the ice-water reservoir, has access to the local weather forecast, and tracks the date.

In operation of the FreeTherm system shown in FIG. 1, heat pump 70 controlled by controller 80 sends anti-freeze through pipes 20 into heat extractors 14 located in shallow pool 12 where in extracting heat, ice is formed on the concaved downward surfaces of the heat exchangers. When the ice builds to about a centimeter in thickness, the extractors are flexed to a larger radius to thereby release the ice from their hydrophobic surfaces. Anti-freeze fluid flowing through pipes 20 harvest the latent heat of fusion as water is frozen to ice. This heat is delivered into the home by heat pump 70.

It should now be understood that a low cost, highly efficient, thermal energy storage system been disclosed that includes a reservoir for storing and extracting thermal energy cyclically by freezing and thawing ice-water in the reservoir interseasonally. Heat extractors are positioned within the reservoir to extract thermal energy from the ice water. A heat exchanger is included to allow the heat pump system to operate efficiently by extracting thermal energy from substantially warmer outdoor air and delivering it into the ice water. The heat exchanger includes a convection-assisted insulated tower and a program of downward airflow through the heat exchanger and tower. A solar collector can also be used as an additional means of melting the ice and thus, recharging the tank.

While the invention has been described in conjunction with the specific embodiments outlined above, it is evident that many alternatives, modifications and variations will be apparent to those skilled in the art. Accordingly, the preferred embodiments of the invention as set forth above are intended to be illustrative and not limiting. Various changes may be made without departing from the spirit and scope of the invention as defined herein.

What is claimed is:

1. In a heat pump heating and cooling system, the improvement comprising:
    a pool, said pool having ice-water therein for delivering and storing thermal energy for temperature control of a dwelling by heating or cooling the dwelling;
    heat extractors positioned within said pool and spaced a predetermined distance from the bottom thereof;
    bladder members positioned on one surface of said heat extractors with said bladder members having channels therethrough;
    at least one pump for pumping an anti-freeze solution through said bladder members so that in a heating mode, the anti-freeze solution pushed through said bladder members will extract heat from said heat extractors.

2. The improvement of claim 1, wherein said heat extractors include concave hydrophobic surfaces.

3. The improvement of claim 2, wherein said heat extractors are made-of a thermally conducting flexible material behind which said anti-freeze solution flows.

4. The improvement of claim 3, wherein said flexible material forms ice in sufficiently thick layers that the ice can be removed from said hydrophobic surfaces by tipping unsupported ends of said heat extractors upward to release loose pieces of ice from said hydrophobic surfaces, whereby the loosened pieces of ice float upward in said pool.

5. The improvement of claim 1, including a heat exchanger.

6. The improvement of claim 5, including a convection tower, and wherein said heat exchanger is mounted at the top of said convection tower to ensure that air flowing within said convection tower is assisted by convection forces.

7. The improvement of claim 4, wherein the total area of said concaved surfaces of said heat extractors is capable of conducting 560 calories/sec/ton of the maximum heating required when coated with ice to a thickness of about 5 mm and the temperature of the anti-freeze solution contained in bladders behind said flexible hydrophobic surfaces is about −3° C.

8. The improvement of claim 1, including stop members.

9. The improvement of claim 8, wherein said heat extractors are adapted for rotation through a predetermined arc.

10. The improvement of claim 9, wherein said heat extractors include extension arms adapted to mate with said stop members during a portion of said predetermined arc of rotation of said heat extractors.

11. A thermal energy storage system, comprising:
    a shallow pool, said shallow pool having ice-water therein for delivering and storing thermal energy for temperature control of a dwelling by heating or cooling the dwelling;
    heat extractors positioned within said shallow pool and spaced a predetermined distance from the bottom thereof,
    bladder members positioned on a surface of said heat extractors, said bladder members having channels therethrough;
    at least one pump for pumping an anti-freeze solution through said bladder members so that in a heating mode, the anti-freeze solution pushed through said bladder members will extract heat from said heat extractors.

12. The thermal storage system of claim 11, wherein said heat extractors include concave hydrophobic surfaces.

13. The thermal energy storage system of claim 12, wherein said heat extractors are made of a thermally conducting flexible material.

14. The thermal energy storage system of claim 13, wherein said flexible material forms ice in sufficiently thick layers that the ice can be removed from said hydrophobic surfaces by tipping unsupported ends of said heat extractors upward to release loose pieces of ice from said hydrophobic surfaces, whereby the loosened pieces of ice float upward in said shallow pool.

15. The thermal energy storage system of claim 11, including a heat exchanger.

16. The thermal energy storage system of claim 15, including a convection tower, and wherein said heat exchanger is mounted at the top of said convection tower to ensure that air flowing within said convection tower is assisted by convection forces.

17. The thermal energy storage system of claim 12, wherein the total area of said concave surfaces of said heat extractors is capable of conducting 560 calories/sec/ton of the maximum heating required when coated with ice to a thickness of about 5 mm and the temperature of the anti-freeze solution contained behind said flexible hydrophobic surfaces is about −3° C.

18. In a heat pump heating and cooling system, the improvement comprising:
    a pool, said pool having ice-water therein for delivering and storing thermal energy for temperature control of a dwelling by heating or cooling the dwelling;
    at least one heat extractor positioned within said pool and spaced a predetermined distance from the bottom thereof;
    at least one bladder member positioned on one surface of said at least one heat extractor with said at least one bladder member having channels therethrough;
    at least one pump for pumping an anti-freeze solution through said at least one bladder member so that in a heating mode, the anti-freeze solution pushed through said at least one bladder member will extract heat from said at least one heat extractor.

19. The improvement of claim 18, wherein said at least one heat extractor includes a concave hydrophobic surface.

20. The improvement of claim 19, wherein said at least one heat extractor is made of a thermally conducting flexible material behind which said anti-freeze solution flows.

* * * * *